Oct. 4, 1966          E. R. BRASTOW ETAL          3,276,268
                      GYROSCOPIC INSTRUMENT
                      Filed March 23, 1964
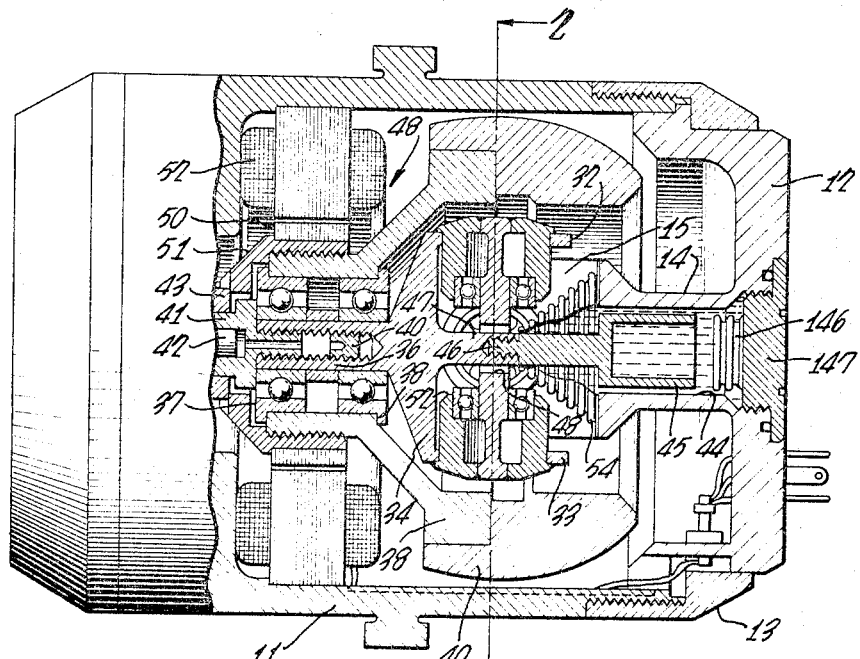
FIG_1
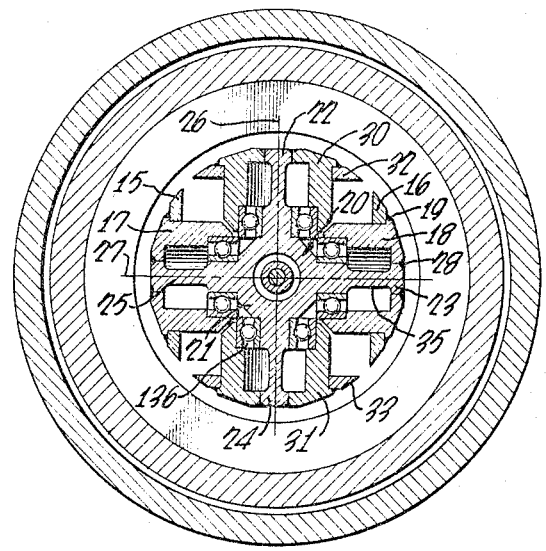
FIG_2
INVENTORS.
EDGAR R. BRASTOW
JAMES BJORDAHL
BY
ATTORNEY.

United States Patent Office 3,276,268
Patented Oct. 4, 1966

3,276,268
GYROSCOPIC INSTRUMENT
Edgar R. Brastow, Woodland Hills, and James Bjordahl, Temple City, Calif., assignors to Clary Corporation, San Gabriel, Calif., a corporation of California
Filed Mar. 23, 1964, Ser. No. 353,988
12 Claims. (Cl. 74—5)

This invention relates to gyroscopic instruments and has particular reference to two-axis rate gyroscopes.

A rate gyroscope generally provides an indication by way of an output signal, which constitutes a measure of the angular rate at which the gyroscope base or housing is being turned about an axis. Such axis extends perpendicular to the rotor spin axis and, in the case of two-axis gyroscopes, such axis may be any axis perpendicular to the spin axis.

A gimbal restraint means, such as a spring, is provided to resist precessing of a gyroscope and such means deflects an amount proportional to the angular rate of input. Such deflection therefore constitutes a measure of the amount of input rate. An equilibrium point is reached when the reactive torque developed by the restraint means balances out the gyroscopic torque developed from the input angular rate. When the input movement recedes to zero, the restraint means returns the rotor to a natural or normal position relative to the housing.

A principal object of the present invention is to provide a small, compact, two-axis rate gyroscopic instrument.

Another object is to provide a two-axis rate gyroscopic instrument which is economical to manufacture and yet highly sensitive and of rugged construction.

Another object is to provide a two-axis rate gyroscopic instrument which provides a linear reaction to an input angular rate.

The present invention is an improvement over that disclosed and claimed in the copending application of C. R. Amsler et al., Serial No. 346,619, filed February 24, 1964, and since matured into Patent No. 3,220,265, issued on November 30, 1965, in that it is easier to manufacture and assemble. Further, the present invention provides a more linear reaction to angular movement of the gyro relative to its spin axis.

The manner in which the above and other objects of the invention are accomplished will be readily understood on reference to the following specification when read in conjunction with the accompanying drawings, wherein:

FIG. 1 is a side view, partly in section, of a two-axis rate gyroscope embodying a preferred form of the present invention.

FIG. 2 is a transverse sectional view of the gyroscope and is taken along the line 2—2 of FIG. 1.

Referring to the drawing, the gyroscope comprises a three-part housing including a case 11, an end cap 12 and a clamp nut 13. The latter is removably threaded onto the case to retain the end cap firmly in place at one end of the case. The cap may also hermetically seal the interior of the housing.

A yoke member 14 is formed integrally with the end cap 12 and comprises a pair of spaced arms 15 and 16 having aligned openings therethrough. Coaxially extending sleeves 17 and 18 are fitted in the openings and are secured to the respective arms at 19, as by soldering.

A combined rotor support and restraint member generally indicated at 20, in the form of a cross, is provided to both support the rotor and to form a yieldable restraint against turning movement of the gyro case about an axis transverse to the spin axis of the rotor. For this purpose, the member 20 is formed with a central hub 21 having four integral, radially extending, flexible arms 22, 23, 24 and 25.

The arms 22 to 25 are arranged in two pairs, each pair extending coaxially and one pair extending at 90 degrees to the other. The axes, i.e. 26 and 27, of the arms intersect each other at the center of the member 20.

The arms 23 and 25 are secured at 28, as by soldering, adjacent their outer ends, to the respective sleeves 18 and 17. Likewise, the arms 22 and 24 are similarly secured adjacent their outer ends to coaxially extending sleeves 30 and 31 which, in turn, are secured, as by soldering, in openings formed in respective arms 32 and 33 of a second yoke or bearing member generally indicated at 34.

It will be noted that the arms 22 to 25 of the restraint member are reduced in diameter at 35 intermediate their ends. These form torsional spring sections whose reaction to torsional stress is proportional to the amount of strain applied by the input moment.

In order to confine deflection of the arms of the restraint member to purely torsional deflection, ball bearings, i.e. 136, are mounted between the inner ends of the arms 22 to 25 and their respective sleeves. The bearings rotatably support the arms of the restraint member against bending, as might occur upon rapid acceleration or deceleration of the gyroscope in the direction of its spin axis.

The yoke member 34 has an outwardly extending shaft 36 on which are mounted spaced ball bearings 37 and 38. The latter, in turn, rotatably support a rotor 38 to which is suitably secured a rotor mass 40.

The shaft 36 has a screw threaded, axially extending hole formed therein, in which is threaded an adjustable balance weight 40. A retainer member 41 is threadably attached in the opening to retain the bearings 37 and 38 in place. Such member has an axial hole therein in which is normally inserted a caging pin 42 carried by a drive member 43 forming part of a combined driving and caging device (not shown). Such device is preferably similar to that disclosed and claimed in the copending application of George F. East et al., Serial No. 174,899, filed February 21, 1962. The device is arranged to first rotate the drive member 43 which is normally coupled to a rotor cap 51 attached to the rotor 38 so as to bring the rotor up to controlling speed and it thereafter moves the drive member to the left in FIG. 1 so as to first uncouple the same from the rotor and thereafter withdraw the caging pin 42 so that the rotor can maintain its position in space.

Means are provided to exert a damping restraint on the gyroscope and for this purpose a cylindrical damping chamber 44 is formed in the base of the yoke member 14. A cylindrical damping member 45 of slightly smaller diameter than the inside diameter of the chamber extends therein and is screw-threadably attached at 46 to a projection 47 forming an integral part of the yoke member 34. The projection 47 extends through a central opening 48 formed in the restraint member 20.

The damping chamber 44 is filled with a suitable damping fluid which acts against the damping member 45. Such fluid is retained in the chamber by a highly flexible bellows 54. The latter is attached at its right hand end to the yoke member 14. At its lefthand end the bellows is clamped between the damping member and the projection 47.

A bellows 146 extends into the chamber 44 and is mounted on a removable filler plug 147 which is screw threaded into the cap member 12. The bellows acts to compensate for expansion and contraction of the damping fluid in response to changes in ambient temperature, etc., so as to maintain the fluid under a pressure greater than the vapor pressure of the damping fluid and to maintain the damping chamber filled at all times.

A pick-off or signal generator generally indicated at 48 is provided to indicate the movement of the housing about any input axis intersecting the intersection of the mutually perpendicular axes 26 and 27. The device comprises a rotor 50 suitably attached to the rotor cap 51 and a stator 52 suitably attached to the interior of the case 11 and magnetically coupled to the rotor 50. The pick-off device may be of any suitable type, preferably operated by alternating current, to emit signals which vary in size and phase in proportion to angular displacement between the case and the rotor.

When assembling the gyroscope, the arms of the restraint member are first located within the openings in the arms of the yoke members 14 and 34. Thereafter, the sleeves, i.e. 17 and 18, and the attached bearings 136 are fitted over respective ones of the arms of the restraint member and through the openings in the respective arms of the yoke members. Finally, the various arms of the restraint member, the sleeves and the arms of the yoke members are secured together as noted hereinbefore.

It will be noted that the inner ends of the sleeves are beveled, as at 52, to permit the inner ends of the sleeves and their bearings to be located as close to the spin axis of the rotor as possible.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. A gyroscopic instrument comprising a first support,
   a restraint member having four radially extending resilient arms,
   a first pair of said arms extending coaxially of each other,
   a second pair of said arms extending coaxially of each other and perpendicular to said first pair of arms,
   the axes of said arms intersecting each other,
   means securing said first pair of arms to said first support,
   bearings carried by said first support for confining said first pair of arms to torsional movement about the axes thereof,
   a second support,
   means securing said second pair of arms to said second support,
   bearings carried by said second support for confining said second pair of arms to torsional movement about the axes thereof,
   a rotor supported by one of said supports for rotation about a spin axis coincident with said intersection,
   and a pick-off device for indicating the angular movement of the other of said supports about said intersection and relative to said spin axis.

2. A gyroscopic instrument according to claim 1 comprising means for damping movement of said arms upon said relative movement between said last mentioned support and said spin axis.

3. A gyroscopic instrument comprising a first support,
   a restraint member having four radially extending resilient arms,
   a first pair of said arms extending coaxially of each other,
   a second pair of said arms extending coaxially of each other and perpendicular to said first pair of arms,
   means securing said first pair of arms adjacent their outer ends to said first support,
   bearings carried by said first support for confining said first pair of arms adjacent their inner ends to torsional movement about the axes thereof,
   a second support,
   means securing said second pair of arms adjacent the outer ends thereof to said second support,
   bearings carried by said second support for confining said second pair of arms adjacent their inner ends to torsional movement about the axes thereof,
   a rotor supported by one of said supports for rotation about a spin axis extending perpendicular to said first mentioned axes,
   and a pick-off device for indicating the angular movement of the other of said supports relative to said spin axis.

4. A gyroscopic instrument comprising a support,
   a first yoke member carried by said support,
   a restraint member having four radially extending resilient arms,
   a first pair of said arms extending coaxially of each other,
   a second pair of said arms extending coaxially of each other and perpendicular to said first pair of arms,
   the axes of said arms intersecting each other,
   means securing said first pair of arms to respective arms of said yoke member,
   a second yoke member,
   means securing said second pair of arms to respective arms of said second yoke member,
   a rotor supported by said second yoke member for rotation about a spin axis coincident with said intersection,
   and a pick-off device for indicating the angular movement of said support about said intersection and relative to said spin axis.

5. A gyroscopic instrument comprising a first support,
   a restraint member having four radially extending resilient arms,
   a first pair of said arms extending coaxially of each other,
   a second pair of said arms extending coaxially of each other and perpendicular to said first pair of arms,
   the axes of said arms intersecting each other,
   means securing said first pair of arms adjacent their outer ends to said first support,
   bearings carried by said first support for rotatably supporting said first pair of arms adjacent their inner ends and for confining said first pair of arms to torsional movement,
   a second support,
   means securing said second pair of arms adjacent their outer ends to said second support,
   bearings carried by said second support for rotatably supporting said second pair of arms adjacent their inner ends and for confining said second pair of arms to torsional movement,
   a rotor supported by one of said supports for rotation about a spin axis coincident with said intersection,
   and a pick-off device for indicating the angular movement of the other of said supports about said intersection and relative to said spin axis.

6. A gyroscopic instrument comprising a support,
   a restraint member having four radially extending resilient arms,
   a first pair of said arms extending coaxially of each other,
   a second pair of said arms extending coaxially of each other and perpendicular to said first pair of arms,
   the axes of said arms intersecting each other,
   means securing said first pair of arms adjacent their outer ends to said support,
   bearings carried by said support for rotatably supporting said first pair of arms adjacent their inner ends and for confining said first pair of arms to torsional movement,
   a bearing member,
   means securing said second pair of arms adjacent the outer ends thereof to said bearing member whereby to support said bearing member, bearings carried by said bearing member for rotatably supporting said second pair of arms adjacent their inner ends and for confining said second pair of arms to torsional movement, a rotor supported by said bearing member for rotation about a spin axis coincident with said intersection, and a pick-off device for indicating the angular movement of said support about said intersection and relative to said spin axis.

7. A gyroscopic instrument comprising a support,
a first yoke member carried by said support,
a restraint member having four radially extending arms,
a first pair of said arms extending coaxially of each other,
a second pair of said arms extending coaxially of each other and perpendicular to said first pair of arms,
the axes of said arms intersecting each other,
means securing said first pair of arms adjacent their outer ends to respective arms of said yoke member,
bearings carried by said yoke member for rotatably supporting said first pair of arms adjacent the inner ends thereof and for confining said first pair of arms to torsional movement,
a second yoke member,
means securing said second pair of arms adjacent the outer ends thereof to respective arms of said second yoke member,
bearings carried by said second yoke member for rotatably supporting said second pair of arms adjacent the inner ends thereof and for confining said second pair of arms to torsional movement,
a rotor supported by said second yoke member for rotation about a spin axis coincident with said intersection,
and a pick-off device for indicating the angular movement of said support about said intersection and relative to said spin axis.

8. A gyroscopic instrument according to claim 7 comprising a damping chamber carried by said first yoke member and a damping member carried by said second yoke member and extending into said chamber for damping the natural period of said second yoke member and said rotor.

9. A gyroscopic instrument comprising a support,
a restraint member having four radially extending resilient arms,
a first pair of said arms extending coaxially of each other,
a second pair of said arms extending coaxially of each other and perpendicular to said first pair of arms,
the axes of said arms intersecting each other,
a first pair of coaxial sleeves attached to said support,
said first pair of arms extending into respective ones of said sleeves,
means securing said first pair of arms adjacent their outer ends to said sleeves,
means forming bearings intermediate said sleeves and said first pair of arms,
said bearings being located adjacent the inner ends of said first pair of arms whereby to confine said first pair of arms to torsional movement,
a bearing member,
a second pair of coaxial sleeves attached to said bearing member,
said second pair of arms extending into respective ones of said second pair of sleeves,
means securing said second pair of arms adjacent their outer ends to said second pair of sleeves,
means forming bearings intermediate said sleeves and said second pair of arms,
said last mentioned bearings being located adjacent the inner ends of said second pair of arms whereby to confine said second pair of arms to torsional movement, a rotor supported by said bearing member for rotation about a spin axis coincident with said intersection, and a pick-off device for indicating the angular movement of said support about said intersection and relative to said spin axis.

10. A gyroscopic instrument comprising a support,
a first yoke member carried by said support,
a restraint member having four radially extending arms,
a first pair of said arms extending coaxially of each other,
a second pair of said arms extending coaxially of each other and perpendicular to said first pair of arms,
the axes of said arms intersecting each other,
a first pair of coaxial sleeves secured to respective arms of said yoke member,
said first pair of arms extending into respective ones of said sleeves,
means securing said first pair of arms adjacent the outer ends thereof to respective ones of said first pair of sleeves,
bearings carried by said first pair of sleeves for rotatably supporting said first pair of arms adjacent their inner ends whereby to confine said first pair of arms to torsional movement,
a second yoke member,
a second pair of coaxial sleeves secured to respective arms of said second yoke member,
said second pair of arms extending into respective ones of said second pair of sleeves,
means securing said second pair of arms adjacent the outer ends thereof to respective ones of said second pair of sleeves,
bearings carried by said second pair of sleeves for rotatably supporting said second pair of arms adjacent their inner ends whereby to confine said second pair of arms to torsional movement,
a rotor supported by said second yoke member for rotation about a spin axis coincident with said intersection,
and a pick-off device for indicating the angular movement of said support about said intersection and relative to said spin axis.

11. A gyroscopic instrument comprising a support,
a restraint member having four radially extending resilient arms,
a first pair of said arms extending coaxially of each other,
a second pair of said arms extending coaxially of each other and perpendicular to said first pair of arms,
the axes of said arms intersecting each other,
means securing said first pair of arms adjacent their outer ends to said support,
a bearing member,
means securing said second pair of arms adjacent the outer ends thereof to said bearing member whereby to support said bearing member,
means on said support forming a damping chamber,
said restraint member having an opening therethrough,
a damping member carried by said bearing member and extending through said opening into said chamber,
a damping fluid in said chamber,
and a rotor supported by said bearing member for rotation about a spin axis coincident with said intersection.

12. A gyroscopic instrument comprising a support,
a first yoke member carried by said support,
a restraint member having four radially extending resilient arms,
a first pair of said arms extending coaxially of each other,
a second pair of said arms extending coaxially of each other and perpendicular to said first pair of arms, the axes of said arms intersecting each other,
means securing said first pair of arms to respective arms of said yoke member,
a second yoke member,
means securing said second pair of arms to respective arms of said second yoke member,
said restraint member having an opening therethrough,
said first yoke member having a damping chamber therein,
a damping member carried by said second yoke member and extending through said opening into said chamber,
a damping fluid in said chamber,
and a rotor supported by said second yoke member for rotation about a spin axis coincident with said intersection.

References Cited by the Examiner
UNITED STATES PATENTS

| | | | |
|---|---|---|---|
| 2,740,299 | 4/1956 | Jewell | 74—5.47 X |
| 3,142,184 | 7/1964 | East et al. | 74—5.7 X |
| 3,176,523 | 4/1965 | Amlie et al. | 74—5.6 |

FRED C. MATTERN, Jr., *Primary Examiner.*

BROUGHTON G. DURHAM, *Examiner.*

T. W. SHEAR, P. W. SULLIVAN, *Assistant Examiners.*